United States Patent [19]
Kato

[11] Patent Number: 5,884,183
[45] Date of Patent: Mar. 16, 1999

[54] MOBILE COMMUNICATION SYSTEM AND MESSAGE OUTPUT METHOD THEREFOR

[75] Inventor: Kenichi Kato, Tokyo, Japan

[73] Assignee: NEC Corporation, Japan

[21] Appl. No.: 570,104

[22] Filed: Dec. 11, 1995

[30] Foreign Application Priority Data

Dec. 16, 1994 [JP] Japan .................................. 6-313241

[51] Int. Cl.[6] .................................................. H04B 7/00
[52] U.S. Cl. .......................... 455/517; 455/435; 455/510; 455/524
[58] Field of Search .................................. 455/33.1, 54.1, 455/54.2, 56.1, 76, 422, 510, 517, 524, 432, 435, 412, 426, 561, 563; 379/59–60

[56] References Cited

U.S. PATENT DOCUMENTS

| | | | |
|---|---|---|---|
| 5,054,110 | 10/1991 | Comroe et al. | 455/435 |
| 5,327,574 | 7/1994 | Momma et al. | 455/33.2 |
| 5,339,353 | 8/1994 | Asahara et al. | 379/59 |
| 5,369,683 | 11/1994 | Yabe et al. | 379/59 |
| 5,475,862 | 12/1995 | Sawyer | 455/435 |
| 5,542,094 | 7/1996 | Owada et al. | 455/54.2 |
| 5,566,356 | 10/1996 | Taketsugu | 455/56.1 |
| 5,568,654 | 10/1996 | Fukawa | 455/56.1 |
| 5,621,784 | 4/1997 | Tiedemann, Jr. et al. | 455/435 |

OTHER PUBLICATIONS

WPI Abstract Accession No. 92–253132/31 and JP 4168857 A, Jun. 17, 1992.

*Primary Examiner*—William A. Cuchlinski, Jr.
*Assistant Examiner*—Gertrude Arthur
*Attorney, Agent, or Firm*—Ostrolenk, Faber, Gerb & Soffen, LLP

[57] ABSTRACT

A mobile communication system includes a switching unit, a plurality of radio base stations, and a mobile station. The switching unit processes a call from an originating terminal. The radio base stations have service areas allowing radio communication and are connected to the switching unit. The mobile station performs radio communication with the radio base station within the service area. The switching unit includes a switching section, a database, and a message forming section. The switching section performs switching/connection between the originating terminal and the mobile station on a terminating side through the radio base station. The database stores last registration time recognized by the mobile station. The message forming section forms a speech message including the last registration time stored in the database and outputting the message to the originating terminal when there is no response from the mobile station with respect to a terminating operation.

10 Claims, 2 Drawing Sheets

MOBILE COMMUNICATION SYSTEM AND MESSAGE OUTPUT METHOD THEREFOR

BACKGROUND OF THE INVENTION

The present invention relates to a mobile communication system and a message output method therefor, in which information indicating that a mobile station is outside a communication zone is sent to an originating terminal.

In a conventional mobile communication system, when a terminal generates an outgoing call to a mobile station outside a communication zone, a message of this type is sent to the originating terminal to notify that the terminating mobile station is outside the communication zone and hence cannot perform speech communication. The contents of this message are, for example, "We cannot connect you because the telephone set you have dialed is outside the service area or the power switch is off".

However, when a terminal generates an outgoing call to a mobile station outside the communication zone, such a conventional message, however, only notifies the originating terminal that speech communication cannot be performed because the terminating mobile station is outside the communication zone. For this reason, on the originating terminal side, the user cannot know a specific point of time at which the mobile station is set in a communication disable state.

SUMMARY OF THE INVENTION

It is an object of the present invention to provide a mobile communication system and a message output method therefor, in which the last time at which speech communication could be performed is output as a message.

In order to achieve the above object, according to the present invention, there is provided a mobile communication system comprising a switching unit for processing a call from an originating terminal, a plurality of radio base stations which have service areas allowing radio communication and are connected to the switching unit, and a mobile station for performing radio communication with the radio base station within the service area, the switching unit including switching means for performing switching/connection between the originating terminal and the mobile station on a terminating side through the radio base station, memory means for storing last registration time recognized by the mobile station, and message forming means for forming a speech message including the last registration time stored in the memory means and outputting the message to the originating terminal when there is no response from the mobile station with respect to a terminating operation.

DESCRIPTION OF THE PREFERRED EMBODIMENT

Figure 1:
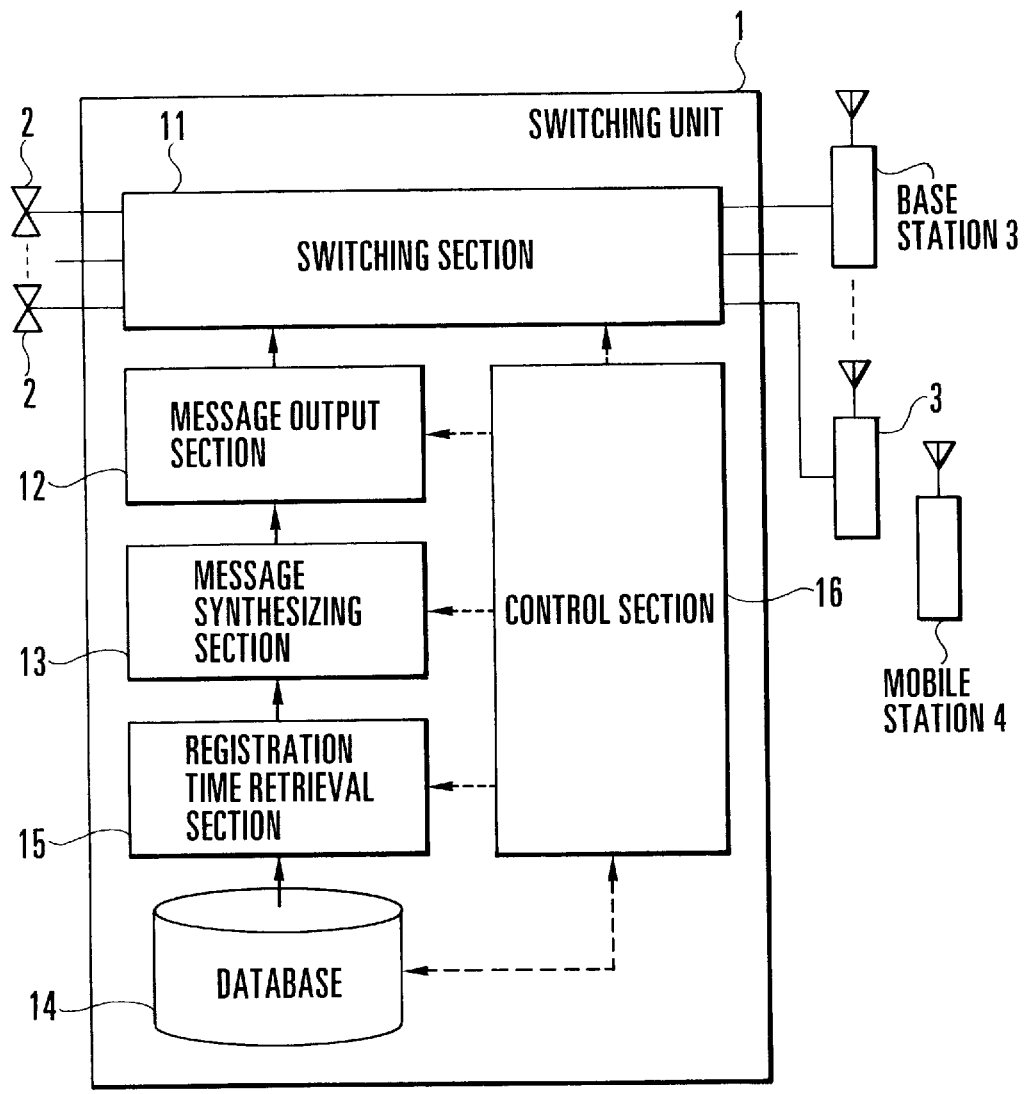
FIG. 1 is a block diagram showing a mobile communication system according to an embodiment of the present invention.

FIG. 1 shows the arrangement of a mobile communication system according to an embodiment of the present invention. A switching unit 1 comprises a switching section 11 for performing switching/connection of lines/channels, a message output section 12 for outputting a speech message to an originating terminal through the switching section 11, a message synthesizing section 13 for synthesizing a speech message output from the message output section 12, a database 14 storing the registration position information, registration time information, and the like of a mobile station 4, a registration time retrieval section 15 for retrieving registration time information stored in the database 14, and a control section 16 for controlling each section in the switching unit 1. The control section 16 registers the initial position of the mobile station 4 in the database 14 when the power switch of the mobile station 4 is turned on. A wire telephone terminal 2 and a base station 3 are connected to the switching unit 1. The mobile station 4 is connected to the base station 3 by radio and performs communication.

A speech message output operation performed by the above mobile communication system will be described next. When the wire telephone terminal 2 generates an outgoing call to the mobile station 4, the switching section 11 calls the mobile station 4 through the base station 3 under the control of the control section 16. If the terminating mobile station 4 is inside the communication zone, i.e., inside the service area of any one of the base stations 3 and in a communication enable state, at this time, the control section 16 causes the switching section 11 to set a wire telephone line between the wire telephone terminal 2 and the base station 3 and a radio channel between the base station 3 and the mobile station 4 in accordance with a response from the mobile station 4. With this operation, speech communication can be performed between the wire telephone terminal 2 and the mobile station 4.

If the power switch of the terminating mobile station 4 is off or outside the communication zone where radio waves can reach, i.e., outside the service areas of all the base stations 3, the mobile station 4 cannot respond to the call, and the control section 16 cannot connect the mobile station 4 to the base station 3 by radio.

In this case, under the control of the control section 16, the database 14, which stores information about the mobile station 4, stores the time at which the power switch of the mobile station 4 was turned on in the service area of any one of the base stations and the time at which an on-hook operation was performed when the mobile station 4 moved from the service area of another base station to the service area of the base station 3 in the communication zone. The time at which the power switch of the mobile station 4 was turned on indicates the time at which the control section 16 registered the position of the mobile station 4 in the database 14.

When terminating connection to the mobile station 4 cannot be performed, the control section 16 starts the registration time retrieval section 15 to detect the latest time as the last registration time from the data associated with the mobile station 4 and stored in the database 14. This last registration time indicates the last time at which the switching unit 1 recognized the mobile station 4.

On the basis of the time detected by the registration time retrieval section 15, the message synthesizing section 13 forms a speech message notifying the caller that speech communication with the mobile station 4 cannot be performed and of the last registration time of the mobile station 4. The message output section 12 outputs the speech message formed by the message synthesizing section 13 to the wire telephone terminal 2 on the originating side through the switching section 11. With this operation, the caller hears the speech messages output from the switching section 11 to know the last registration time of the mobile station 4.

If the last registration time of the mobile station 4 is not much different from the originating time, the caller, which has been notified of the last registration time of the mobile station 4, determines that the possibility that the mobile station 4 has moved outside the communication zone is high, and that there is a possibility that the mobile station 4 will return to the communication zone and can be called if a telephone call is made again after a short period of time.

If the last registration time is considerably different from the originating time, e.g., last registration was performed yesterday, the caller determines that the possibility that the power switch of the mobile station 4 is off is high, and there is a high possibility that connection cannot be performed even if a telephone call is made again. That is, the caller determines, on the basis of the last registration time of the mobile station 4, whether to general an outgoing call to the mobile station 4 again.

Figures 2, 3:
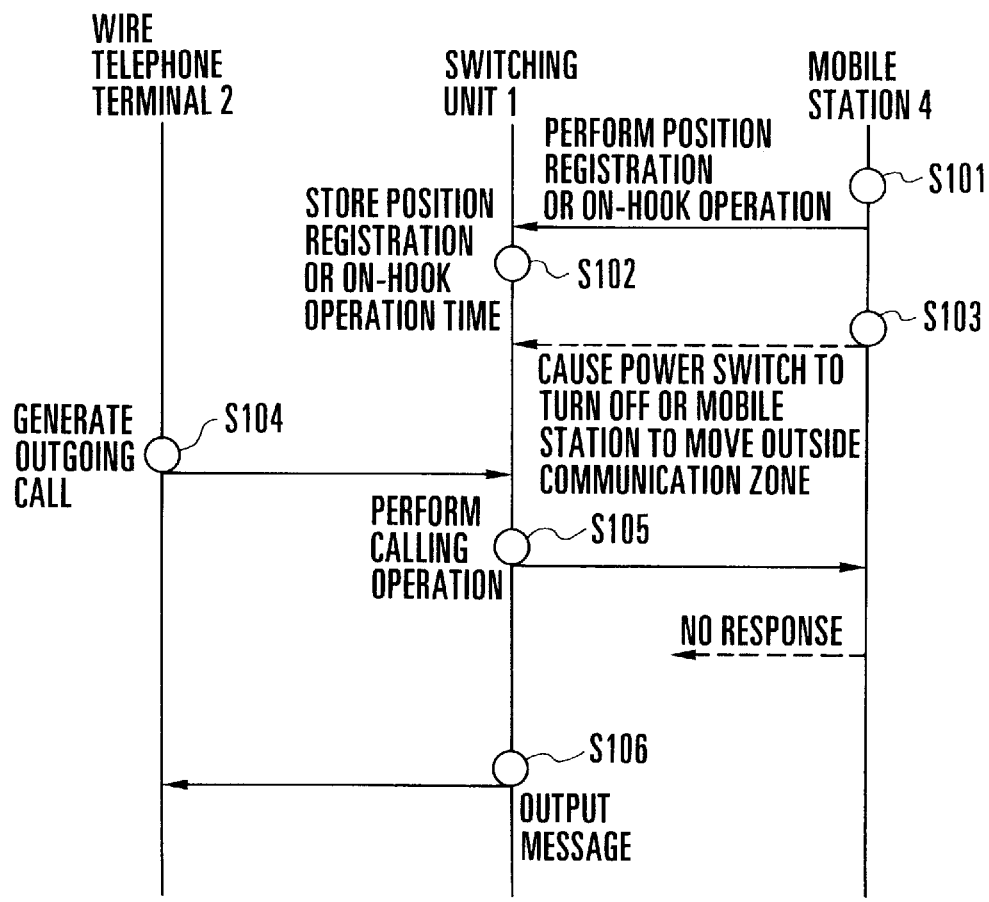
FIG. 2 is a view showing the contents of data stored in a database in FIG. 1.
FIG. 3 is a view showing an operation sequence between a wire telephone terminal, a switching unit, and a mobile station.

FIG. 2 shows an image of terminal information in the database 14, which stores the terminal information of each mobile station. The time at which the power switch of the mobile station 4 was turned on in the service area of any one of the base stations 3 and the time at which an on-hook operation was performed when the mobile station 4 moved from the service area of another base station to the service area of the base station 3 in the communication zone are stored in the database 14 in correspondence with the terminal IDs. In storing data in the database 14, new time data may be overwritten on these registration time data to store only the latest data as last registration time data.

FIG. 3 shows a sequence in which a speech message is output from the switching unit 1 to the wire telephone terminal 2 when the mobile station 4 is outside the communication zone. When the position of the mobile station 4 is registered or an on-hook operation is performed in step S101, the switching unit 1 stores the position registration time or the on-hook operation time in the database 14 in step S102. Thereafter, the power switch of the mobile station 4 is turned off or moved outside the communication zone in step S103. When the wire telephone terminal 2 generates an outgoing call to the mobile station 4 in step S104, the switching unit 1 calls the mobile station 4 in response to this outgoing call in step S105.

In this case, since the mobile station 4 outside the communication zone cannot respond to the call, the switching unit 1 outputs a message indicating that speech communication with the mobile station 4 cannot be performed, and notifies the caller of the last registration time of the mobile station 4 stored in step S102. In this case, the speech message may be "We cannot connect you because the telephone set you have dialed is outside the service area or the power switch is off. The last registration time is ____".

In the above embodiment, the time at which an on-hook operation was performed when the mobile station 4 moved from the current service area is stored in the database 14. However, the time at which an on-hook operation was performed when the mobile station 4 did not move may be stored. In addition, the position of the mobile station 4 is registered when the power switch is turned on. In a system in which a position registration request is output from the switching unit 1 to the mobile station 4, the time at which a response to a position registration request is received may be stored.

As has been described above, according to the present invention, when an outgoing call is generated to a mobile station which cannot perform speech communication, information indicating that the terminating mobile station cannot perform speech communication is sent to the originating side, together with the last time at which speech communication could be performed. The caller can therefore know the latest time at which the mobile station could perform speech communication, and hence can easily determine whether an outgoing call should be generated again.

What is claimed is:

1. A switching unit for a mobile communication system for processing a call from an originating terminal, the system including a plurality of radio base stations which have service areas allowing radio communication and are connected to said switching unit, and a mobile station for performing radio communication with said radio base station within the service area, said switching unit comprising:

switching means for performing switching/connection between said originating terminal and said mobile station on a terminating side through said radio base station;

memory means for storing last registration time recognized by said mobile station; and message forming means for forming a speech message including the last registration time stored in said memory means and outputting the message to said originating terminal when there is not response from said mobile station with respect to a terminating operation.

2. A system according to claim 1, further comprising control means for causing said memory means to store position registration time of said mobile station and on-hook operation time of said mobile station as the last registration time, and wherein said message forming means forms a speech message by using latest position registration time and latest on-hook operation time of said mobile station which are stored in said memory means.

3. A system according to claim 2, wherein said control means causes said memory means to store, as the position registration time of said mobile station, time at which a power switch of said mobile station was turned on within the service area of said mobile station.

4. A system according to claim 1, wherein said memory means comprises a database storing terminal information including a registration position and registration time of said mobile station.

5. A system according to claim 4, further comprising retrieval means for retrieving the last registration time of said mobile station from said database when there is no response from said mobile station with respect to a terminating operation.

6. A system according to claim 1, wherein said message forming means comprises message synthesizing means for synthesizing a speech message including the last registration time stored in said memory means, and a message output means for outputting the speech message from said message synthesizing means to said originating terminal through said switching means.

7. A message output method for a mobile communication system including a switching unit for processing a call from an originating terminal, a plurality of radio base stations which have service areas allowing radio communication and are connected to said switching unit, and a mobile station for performing radio communication with said radio base station within the service area, comprising the steps of:

storing last registration time at which said mobile station switched/connected to a remote terminal through said switching unit and said radio base station was recognized last; and forming a speech message including the last registration time stored in said memory means and outputting the message to said originating terminal when there is no response from said mobile station with respect to a terminating operation.

8. A method according to claim 7, wherein the step of storing last registration time comprises the step of storing position registration time of said mobile station, the step of storing on-hook operation time of said mobile station, and the step of retrieving latest position registration time and latest on-hook operation time of said mobile station as the last registration time.

9. A method according to claim 8, wherein the step of storing position registration time comprises the step of storing time at which a power switch of said mobile station was turned on within the service area of said mobile station.

10. A switching unit for a mobile communication system for processing a call from an originating terminal, the system including a plurality of radio base stations which have service areas allowing radio communication and are connected to said switching unit, and a mobile station for performing radio communication with said radio base station within the service area, said switching unit comprising:

a switching section coupled to said originating terminal and coupled to said plurality of radio base stations, said switching section establishing a connection between said originating terminal and said mobile station through one of said radio base stations;

a memory storing a last registration time recognized by said mobile station;

a message synthesizing section coupled to said memory and synthesizing a speech message including the last registration time stored in said memory;

a message output section coupled to the message synthesizing section and coupled to said switching section, said message ouputting section outputting the speech message synthesized by said message synthesizing section to said switching section for transmission to said originating terminal; and a control section coupled to said memory and storing in said memory a position registration time of said mobile station and an on-hook operation time of said mobile station as said last registration time, said control section further storing in said memory as said last registration time the time at which a power switch of said mobile station was turned on within the service area of said mobile station.

\* \* \* \* \*